United States Patent
Egorov et al.

(10) Patent No.: US 12,182,963 B2
(45) Date of Patent: Dec. 31, 2024

(54) IMAGE PROCESSING APPARATUS AND METHOD IMPLEMENTING A NEURAL NETWORK TO PRE-PROCESS A CFM IMAGE FOR FURTHER PROCESS BY ISP PIPELINE

(71) Applicant: Huawei Technologies Co., Ltd., Shenzhen (CN)

(72) Inventors: Nickolay Dmitrievich Egorov, Saint (RU); Elena Alexandrovna Alshina, Munich (DE); Marat Ravilevich Gilmutdinov, Saint (RU); Dmitry Vadimovich Novikov, Saint (RU); Anton Igorevich Veselov, Saint (RU); Kirill Aleksandrovich Malakhov, Saint (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 17/458,699

(22) Filed: Aug. 27, 2021

(65) Prior Publication Data
US 2021/0390658 A1 Dec. 16, 2021

Related U.S. Application Data

(63) Continuation of application No. PCT/RU2019/000131, filed on Feb. 27, 2019.

(51) Int. Cl.
*G06T 3/4015* (2024.01)
*G06N 3/08* (2023.01)
(Continued)

(52) U.S. Cl.
CPC ............ *G06T 3/4015* (2013.01); *G06N 3/08* (2013.01); *G06T 5/70* (2024.01); *G06T 5/73* (2024.01);
(Continued)

(58) Field of Classification Search
CPC ....... G06T 3/4015; G06T 5/002; G06T 5/003; G06T 5/007; G06T 2207/10144;
(Continued)

(56) References Cited

U.S. PATENT DOCUMENTS

| 2014/0176760 A1* | 6/2014 | Taguchi ............... H04N 25/133 |
| | | 348/224.1 |
| 2017/0185871 A1* | 6/2017 | Zhang .............. G06V 30/19173 |

(Continued)

FOREIGN PATENT DOCUMENTS

| CN | 101490694 B | 6/2012 |
| CN | 103747189 A | 4/2014 |

(Continued)

OTHER PUBLICATIONS

S. Ratnasingam, "Deep Camera: A Fully Convolutional Neural Network for Image Signal Processing," 2019 IEEE/CVF International Conference on Computer Vision Workshop (ICCVW), Seoul, Korea (South), 2019, pp. 3868-3878, doi: 10.1109/ICCVW.2019.00480. (Year: 2019).*

(Continued)

*Primary Examiner* — Andrae S Allison
(74) *Attorney, Agent, or Firm* — Leydig, Voit & Mayer, Ltd.

(57) ABSTRACT

An image processing apparatus processes a color filter mosaic, CFM, image of a scene into a final image of the scene. The image processing apparatus includes processing circuitry configured to implement a neural network. The neural network is configured to process the CFM image into an enhanced CFM image. The processing circuitry is further configured to transform the enhanced CFM image into the final image.

11 Claims, 5 Drawing Sheets

(51) Int. Cl.
*G06T 5/70* (2024.01)
*G06T 5/73* (2024.01)
*G06T 5/90* (2024.01)

(52) U.S. Cl.
CPC ...... *G06T 5/90* (2024.01); *G06T 2207/10144* (2013.01); *G06T 2207/20081* (2013.01); *G06T 2207/20084* (2013.01)

(58) Field of Classification Search
CPC . G06T 2207/20081; G06T 2207/20084; G06T 5/00; G06T 2207/10024; G06N 3/08; G06N 3/045; G06N 3/084; H04N 25/13; H04N 23/86; H04N 23/88; H04N 2209/045; H04N 9/646
See application file for complete search history.

(56) References Cited

U.S. PATENT DOCUMENTS

| | | | | |
|---|---|---|---|---|
| 2018/0061020 | A1* | 3/2018 | Hiasa | G06T 3/60 |
| 2019/0213719 | A1* | 7/2019 | Hiasa | G06T 5/009 |
| 2021/0168408 | A1* | 6/2021 | Malakhov | H04N 19/167 |
| 2023/0127009 | A1* | 4/2023 | Gilmutdinov | G06T 3/4015 |
| | | | | 382/156 |

FOREIGN PATENT DOCUMENTS

| | | |
|---|---|---|
| CN | 106934426 A | 7/2017 |
| CN | 108364267 A | 8/2018 |
| CN | 108965731 A | 12/2018 |
| WO | 2019152534 A1 | 8/2019 |

OTHER PUBLICATIONS

Schwartz, Eli, Raja Giryes, and Alex M. Bronstein. "Deepisp: Toward learning an end-to-end image processing pipeline." IEEE Transactions on Image Processing 28.2 (2019): 912-923. (Year: 2019).*

A. Grundhofer and G. Rothlin, "Camera-specific image quality enhancement using a convolutional neural network," 2017 IEEE International Conference on Image Processing (ICIP), Beijing, China, 2017, pp. 1392-1396, doi: 10.1109/ICIP.2017.8296510. (Year: 2017).*

L. Zhang and W. Zuo, "Image Restoration: From Sparse and Low-Rank Priors to Deep Priors [Lecture Notes]," in IEEE Signal Processing Magazine, vol. 34, No. 5, pp. 172-179, Sep. 2017, L. Zhang and W. Zuo, "Image Restoration: From Sparse and Low-Rank Priors to Deep Priors [Lecture Notes]," (Year: 2017).*

Feng, Y. Zhao, J. C.-W. Chan, S. G. Kong, X. Zhang and B. Wang, "Mosaic Convolution-Attention Network for Demosaicing Multispectral Filter Array Images," in IEEE Transactions on Computational Imaging, vol. 7, pp. 864-878, 2021, doi: 10.1109/TCI.2021.3102052. (Year: 2021).*

Ashouri, Amir H., Tarek S. Abdelrahman, and Alwyn Dos Remedios. "Retraining-free methods for fast on-the-fly pruning of convolutional neural networks." Neurocomputing 370 (2019): 56-69. (Year: 2019).*

Diamond et al , Dirty Pixels: Towards End-to-end Image Processing and Perception, ACM Transactions on Graphics, vol. 40, No. 3, Article 23. Publication date: Apr. 2021 (Year: 2021).*

"Hikvision DarkFighter Technology, Stunning color video in near darkness," Hikvision, White Paper, https://us.hikvision.om/sites/default/files/hikvision-darkfighter-technology_09-2016.pdf, Total 16 pages (2016-2017).

Zhao et al., "Loss Functions for Image Restoration With Neural Networks," IEEE Transactions on Computational Imaging, vol. 3, No. 1, pp. 47-57, Institute of Electrical and Electronics Engineers, New York, New York (Jan. 2017).

Schwartz et al., "DeepISP: Learning End-to-End Image Processing Pipeline," arXiv:1801.06724v1 [eess.IV], Total 8 pages (Jan. 20, 2018).

Chen et al., "Learning to See in the Dark," Total 10 pages (May 2018).

"Series G: Transmission Systems and Media, Digital Systems and Networks, Digital transmission systems—Digital networks—SDH network characteristics, Types and characteristics of SDH network protection architectures," ITU-T Recommendation G.841, ITU-T Telecommunication Standardization Sector of ITU, G.841, Total 141 pages, International Telecommunication Union, Geneva, Switzerland (Oct. 1998).

Ronneberger et al., "U-Net: Convolutional Networks for Biomedical Image Segmentation," MICCAI 2015, Part III, LNCS 9351, pp. 234-241, Springer International Publishing Switzerland (2015).

Xie et al., "Image Denoising and Inpainting with Deep Neural Networks," NIPS'12: Proceedings of the 25th International Conference on Neural Information Processing Systems, Total 9 pages (2012).

Sumner, "Processing RAW Images in MATLAB," pp. 1-15, https://rcsumner.net/raw_guide/RAWguide.pdf (May 19, 2014).

Park "Architectural Analysis of a Baseline ISP Pipeline" in "Theory and Applications of Smart Cameras," KAIST Research Series, Total 364 pages, Springer Netherlands (2016).

* cited by examiner

400

401 Training a neural network using a plurality of pairs of training images, wherein each pair of training images comprises a first training image and a second training image, wherein the first training image and the second training image are a first and a second CFM image of a training scene, respectively

Fig. 4

IMAGE PROCESSING APPARATUS AND METHOD IMPLEMENTING A NEURAL NETWORK TO PRE-PROCESS A CFM IMAGE FOR FURTHER PROCESS BY ISP PIPELINE

CROSS-REFERENCE TO RELATED APPLICATIONS

This application is a continuation of International Application No. PCT/RU2019/000131, filed on Feb. 27, 2019, the disclosure of which is hereby incorporated by reference in its entirety.

FIELD

The present disclosure relates to image and video processing.

BACKGROUND

In recent years, the use of high resolution cameras in mobile phones has become increasingly popular. However, due to space constraints, their hardware is limited with respect to the pixel size and the quality of the optics. Moreover, mobile phones are usually hand-held, and therefore, not stable enough for long exposure times. For these reasons, the imaging hardware in these devices is usually paired with image signal processing (ISP) algorithms to compensate for these limitations.

The cameras used in mobile phones and other electronic devices are often configured to capture an image of a scene using an image sensor having a color filter mosaic, CFM, (also known as a color filter array, CFA) resulting in a CFM image. For example, one of the following color filter mosaics or arrays can be used: a Bayer filter, a Red Green Blue Emerald (RGBE) filter, a Cyan Yellow Yellow Magenta (CYYM) filter, a Cyan Yellow Green Magenta (CYGM) filter, a Red Green Blue White (RGBW) Bayer filter, or an X-Trans filter. A color filter mosaic or array is a mosaic of tiny color filters placed over the pixel sensors of an image sensor. It allows to measure the intensity of the light in a specific wavelength region for each pixel. For example, an image sensor equipped with a Bayer filter measures in each pixel either the red (R), green (G), or blue (B) light, i.e. color channel.

A CFM image (i.e. a raw image produced by such an image sensor) indicates for each pixel of the image an intensity level. A CFM image requires specific processing to generate an Red Greed Blue (RGB) image that can be displayed on a display, e.g., a display of a mobile phone. A data processing procedure which converts a color filter mosaic image (or CFM signal) into an RGB image (or signal) may comprise or be implemented as an image signal processing (ISP) pipeline. An ISP pipeline may include, for example, one or more of the following processing steps: denoising, white balancing, de-mosaicing, tone mapping, contrast enhancement, and/or sharpening. RGB data obtained after ISP may be compressed and then be stored on the camera or transmitted to an external network.

Usually, a color filter mosaic image (or signal) of a scene differs greatly from a RGB image of the scene in its statistical and visual quality. A color filter mosaic image (or signal) may suffer from artefacts such as impulse-like noise due to sensor defects (called dead pixels), noise components with high amplitude caused by semi-conductor properties, illumination source dependent colors, sensor specific colors (which may look unnatural to humans), and low data contrast (especially in dark regions). Furthermore, due to the usage of a color filter mosaic only one color is known for each point of the image while all three basic color (RGB) values are needed. These issues can be resolved by the various processing steps of the ISP pipeline.

Converting a CFM image (or signal) into an RGB image involves several tasks. Each task can pose specific challenges. For instance, the suppression of noise (e.g., based on a noise model) can entail the loss of valuable details in the image. Color correction (also known as white balancing) is a perceptually dependent procedure and requires semantic knowledge about the captured scene to provide high perceptual quality. Contrast enhancement should be done adaptively for different image regions, should preserve the natural colors after enhancement and should not amplify the noise.

Furthermore, the various tasks may compete with each other. For instance, a contrast enhancement procedure may amplify the noise in the image. Consequently, all ISP procedures would benefit from a joint configuration and consideration of inter-procedural dependencies.

It has been suggested to use a supervised learning approach, e.g. a neural network for learning an end-to-end transformation of a CFM image in the form of a Bayer image into an RGB image (see, for instance, Schwartz et al., "DeepISP: Learning End-to-End Image Processing Pipeline", arXiv:1801.06724). In a training stage, pairs of signals/images are used, each pair comprising a low quality Bayer image of a scene and a high quality RGB image of the scene. The high quality RGB image may be generated from a high quality Bayer image using an ISP. The performance of the trained neural network will therefore depend on the quality of the ISP pipeline used during the training stage. This can be disadvantageous in that an expensive retraining may be required in case of modifications, in particular improvements of the ISP pipeline.

In light of the above, the inventors have recognized that there is a need for improved image processing apparatuses and methods addressing at least some of the problems mentioned above.

SUMMARY

Embodiments of the disclosure provide an improved image processing apparatus and a corresponding image processing method.

According to a first aspect, the disclosure relates to an image processing apparatus for processing an original color filter mosaic, CFM, image of a scene into a final image of the scene. The image processing apparatus comprises processing circuitry configured to implement a neural network and to process the original CFM image into an enhanced CFM image using the neural network. The original CFM image and the enhanced CFM image correspond to a same CFM— that is, the original and the enhanced CFM image have the same array of pixels and the same pattern of color channels associated with the array of pixels. The processing circuitry is further configured to transform, i.e. convert the enhanced CFM image into the final image.

Thus, an improved image processing apparatus is provided. The image processing apparatus can be implemented, for instance, in a mobile phone or in a tablet computer. The processing circuitry may comprise one or more processors and a non-transitory storage medium connected to the one or more processors. The non-transitory storage medium may carry executable program code which, when executed by the one or more processors, causes the apparatus to perform the operations or methods described herein.

As used herein, a color filter mosaic (CFM) image is a digital image generated by an image sensor that comprises a pixelated photodetector and a CFM placed in front of the pixelated photodetector, each pixel of the pixelated photodetector having one color filter element of the CFM placed in front of it. A CFM image thus comprises a plurality of samples, each sample mapping to a pixel of the pixelated photodetector and representing the intensity of light in the color channel (e.g. red, green or blue) defined by the color filter element of that pixel. A CFM image may be further processed, either with or without changing the sample pattern (i.e. the total number of samples and their positions) and the color channels. If only the intensities of the samples are changed while the sample pattern and the color channels remain the same, the resulting processed image can still be referred to as a CFM image.

In a further possible implementation form of the first aspect, the CFM is one of the following: a Bayer filter mosaic, an RGBE filter mosaic, a CYYM filter mosaic, a CYGM filter mosaic, or a X-Trans filter mosaic. The final image may be an RGB image.

In a further possible implementation form of the first aspect, transforming the enhanced CFM image into the final image comprises de-mosaicing.

Thus, according to an implementation form, each pixel of the plurality of pixels of the final RGB image comprises three sample values, including a first sample value in the R color channel, a second sample value in the G color channel, and a third sample value in the B color channel. The, original CFM image comprises f multiple color channels, wherein the number of color channels could be, but is not limited to the following values: 1, 2, 3 or more. The neural network, in the application phase, is configured to process the original CFM image into an enhanced CFM image, wherein each pixel of the plurality of pixels of the enhanced CFM image comprises pixels from the same color channels as the original CFM image. The processing circuitry is further configured to convert the enhanced CFM image into the final RGB image. Embodiments of the disclosure can be advantageously implemented using a Bayer filter mosaic.

Thus, embodiments of the disclosure provide a deep learning approach to enhance the quality of an original CFM image before applying ISP to the enhanced CFM image for obtaining the final image. In this approach the neural network does not depend on any specific ISP pipeline implementations during the training stage so that no retraining is required, in case of modifications of the ISP pipeline. Moreover, all available resources of the neural network are used efficiently to learn the enhancements of the original CFM image. Finally, as according to embodiments of the disclosure the neural network is a pre-processing stage prior to the ISP stage for obtaining the final RGB image, the output quality can be easily fine-tuned using parameters associated with the ISP stage.

In a further possible implementation form of the first aspect, processing the original CFM image into the enhanced CFM image and/or transforming the enhanced CFM image into the final image, i.e. the ISP stage comprises one or more of the following: denoising, white-balancing, tone mapping, contrast enhancement, and sharpening.

In a further possible implementation form of the first aspect, the image processing apparatus further comprises an image capturing device (e.g., a camera) for generating the original CFM image of the scene. Alternatively or additionally, the original CFM image may be provided to the image processing device via a wireless communication network.

According to a second aspect, the disclosure relates to a neural network training apparatus. The neural network training apparatus is configured, in a training phase, to train a neural network using a plurality of pairs of training images, wherein each pair of training images comprises a first training image and a second training image, wherein the first training image and the second training image are a first and a second CFM image of a training scene, respectively. The second raw image should have a better image quality that the first raw image.

As will be appreciated, the neural network training apparatus according to the second aspect could be implemented as a component of the image processing apparatus according to the first aspect. Alternatively, the neural network training apparatus can be implemented as a stand-alone device.

In a further possible implementation form of the second aspect, the neural network training apparatus comprises an image capturing device configured to generate the first training image by a first exposure and the second training image by a second exposure that is longer than the first exposure.

In a further possible implementation form of the second aspect, the image capturing device comprises a first optical element, such as a first lens, and a second optical element, such as a second lens, wherein the image capturing device is configured to generate the first training image using the first optical element but not the second optical element and to generate the second training image using the second optical element but not the first optical element, such that the second raw image of the respective scene has a higher quality than the first raw image.

In a further possible implementation form of the second aspect, the neural network training apparatus is configured to generate the first training image and the second training image from a captured CFM image, wherein generating the first training image comprises applying an image degradation operation to the captured CFM image and generating the second training image comprises not applying the image degradation operation to the same CFM image.

In a further possible implementation form of the second aspect, the image degradation operation comprises one or more of the following: distorting the captured CFM image; adding noise (e.g., Gaussian additive noise); lowering brightness; and lowering contrast.

In a further possible implementation form of the second aspect, the neural network comprises a plurality of filter weights, wherein, in the training phase, the neural network training apparatus is configured to iteratively adjust the plurality of filter weights on the basis of the plurality of pairs of training images by using a back propagation algorithm and minimizing a loss function, wherein for each pair of training images the loss function depends on the respective enhanced CFM image provided by the neural network on the basis of the first training image and the respective second training image.

In a further possible implementation form of the second aspect, the loss function is a L1 loss function, a L2 loss function, a SSIM (Structural Similarity Index) loss function, a MS-S SIM (Multi-Scale Structural Similarity Index) loss function or a combination thereof.

In a further possible implementation form of the second aspect, the neural network is a convolutional neural network, CNN. The CNN may be a DeepISP, U-Net or SSDA convolutional neural network, for example.

According to a third aspect, the disclosure relates to a corresponding image processing method for processing an original color filter mosaic, CFM, image of a scene into a final image of the scene. The method comprises the steps of: processing the original CFM image into an enhanced CFM image using a neural network; and transforming the enhanced CFM image into the final image.

Thus, an improved image processing method is provided.

The image processing method according to the third aspect of the disclosure can be performed by the image processing apparatus according to the first aspect of the disclosure. Further features of the image processing method according to the third aspect of the disclosure result directly from the functionality of the image processing apparatus according to the first aspect of the disclosure and its different implementation forms described above and below.

According to a fourth aspect, the disclosure relates to a neural network training method, comprising, in a training phase, the step of training a neural network using a plurality of pairs of training images, wherein each pair of training images comprises a first training image and a second training image, wherein the first training image and the second training image are a first and a second CFM image of a training scene, respectively.

The neural network training method according to the fourth aspect of the disclosure can be performed by the neural network training apparatus according to the second aspect of the disclosure. Further features of the neural network training method according to the fourth aspect of the disclosure result directly from the functionality of the neural network training apparatus according to the second aspect of the disclosure and its different implementation forms described above and below.

According to a fifth aspect, the disclosure relates to a computer program product comprising a non-transitory computer-readable storage medium carrying program code which causes a computer or a processor to perform the method according to the third aspect or the method according to the fourth aspect when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which:

FIG. 4 is a flow diagram showing an example of a neural network training method according to an embodiment of the disclosure.

In the following identical reference signs refer to identical or at least functionally equivalent features.

DETAILED DESCRIPTION

In the following description, reference is made to the accompanying figures, which form part of the disclosure, and which show, by way of illustration, exemplary aspects of embodiments of the disclosure or exemplary aspects in which embodiments of the disclosure may be used. It is understood that embodiments of the disclosure may be used in other aspects and comprise structural or logical changes not depicted in the figures. The following detailed description, therefore, is not to be taken in a limiting sense, and the scope of the invention is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
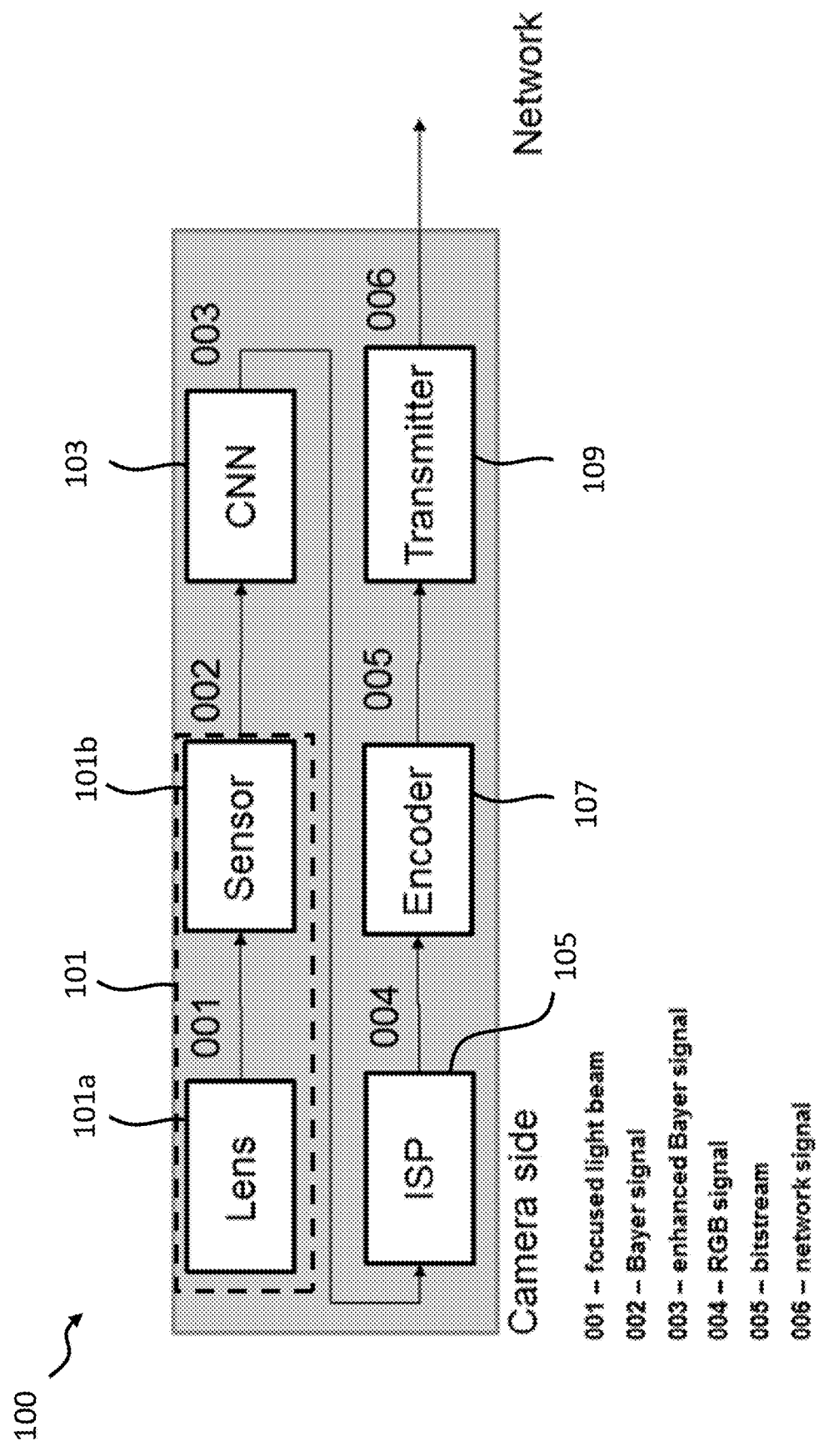
FIG. 1 is a schematic diagram showing an example of an image processing apparatus according to an embodiment of the disclosure.

FIG. 1 shows an image processing apparatus 100 according to an embodiment of the disclosure. According to an embodiment, the image processing apparatus 100 could be implemented as a mobile phone 100 or as a component thereof. Although in the following, the image processing apparatus 100 shown in FIG. 1 will be described in the context of the RGB color space, it will be appreciated that embodiments of the disclosure can be implemented using other color spaces as well, such as the YUV color space and the like.

As will be described in more detail below, the image processing apparatus 100 is configured to process an original color filter mosaic, CFM, image 002 of a scene into a visually enhanced final RGB image (or signal) 004 of the scene. In the example, the CFM is a Bayer filter mosaic and the CFM image 002 may therefore also be referred below to as a Bayer image or Bayer signal 002. Each pixel of the visually enhanced final RGB image 004 comprises or is associated with three sample values, including a first sample value in the R color channel, a second sample value in the G color channel and a third sample value in the B color channel. In the original Bayer image 002 each pixel is associated with one of the multiple color channels of the color filter mosaic, e.g. a Bayer filter mosaic.

As will be appreciated, a color filter mosaic (CFM) image is a digital image generated by an image sensor that comprises a pixelated photodetector and a CFM placed in front of the pixelated photodetector, each pixel of the pixelated photodetector having one color filter element of the CFM placed in front of it. A CFM image thus comprises a plurality of samples, each sample mapping to a pixel of the pixelated photodetector and representing the intensity of light in the color channel (e.g. red, green or blue) defined by the color filter element of that pixel. A CFM image may be further processed, either with or without changing the sample pattern (i.e. the total number of samples and their positions) and the color channels. If only the intensities of the samples are changed while the sample pattern and the color channels remain the same, the resulting processed image can still be referred to as a CFM image.

As illustrated in FIG. 1, the image processing apparatus 100 comprises processing circuitry configured to provide, i.e. implement a convolutional neural network (CNN) 103. In an application phase, the CNN 103 is configured to process the raw Bayer image 002 into a visually enhanced raw Bayer image (referred to as enhanced Bayer signal 003 in FIG. 1) by performing several convolutional steps, wherein each pixel of the visually enhanced raw Bayer image 003 comprises a single sample value in the same color channel, namely R, G or B, as the respective pixel of the raw Bayer image 002. In other words, the raw Bayer image 002 and the visually enhanced raw Bayer image 003 have the same format, i.e. data structure, but have a different quality. Here and throughout the description, the Bayer filter or the Bayer image are merely an example of a color filter mosaic or a color filter mosaic image, and the color filter mosaic is not necessarily that of a Bayer filter.

Moreover, as illustrated in FIG. 1, the image processing apparatus 100 can comprise an ISP unit or pipeline 104 for transforming, i.e. converting the visually enhanced raw Bayer image 003 into the visually enhanced final RGB image 004. As already described above, the visually enhanced Bayer image 003 and the visually enhanced final RGB image 004 have different formats, i.e. the visually enhanced Bayer image 003 comprises a single sample value, namely R, G or B, for each pixel, while the visually enhanced final RGB image 004 comprises three separate sample values, namely R, G and B, for each pixel. According to embodiments of the disclosure a plurality of different ISP pipelines or processing schemes can be implement by the unit 105 for transforming the enhanced Bayer image 003 into the RGB image 004, such as the ISP pipelines disclosed in Hyun Sang Park. Chapter "Architectural Analysis of a Baseline ISP Pipeline" in book "Theory and Applications of Smart Cameras", Springer Netherlands, 20 Jul. 2015, which is fully incorporated herein by reference.

According to embodiments of the disclosure, almost any neural network architectures used for image denoising can be used for implementing the CNN 103, wherein the first input layer and the last output layer of the CNN 103 have the format (W, H, 4), where W and H denote the width and the height of each Bayer image. According to embodiments of the disclosure, the CNN 103 can be a DeepISP, as described in Schwartz et al., "DeepISP: Learning End-to-End Image Processing Pipeline", arXiv:1801.06724, a U-Net, as described in Ronneberger et al, "U-Net: Convolutional Networks for Biomedical Image Segmentation", arXiv: 1505.04597, or a SSDA convolutional neural network, as described in Junyuan Xie et al, "Image Denoising and Inpainting with Deep Neural Networks". NIPS'12 Proceedings of the 25th International Conference on Neural Information Processing Systems—Volume 1, Pages 341-349, Lake Tahoe, Nevada—Dec. 3-6, 2012, which are fully incorporated herein by reference.

As illustrated in FIG. 1, the image processing apparatus 100 may further comprise an image capturing device, in particular a camera 101, which can include one or more optical elements, in particular lenses 101a and a sensor 101b. The one or more optical elements 101a are configured to direct a focused light beam 101a representing the captured scene onto the sensor 101b, which, in turn, is configured to provide the original CFM (e.g. Bayer) image 002 based on a Bayer filter mosaic. The Bayer filter mosaic can be implemented, for instance, by using a color filter array in combination of the sensor 101b. Each pixel of the sensor 101b will provide information about one color component only. Although the most widely used color filter mosaic or array is a Bayer filter mosaic (which is why the raw signal from an image sensor is often called a "Bayer signal"), other color filter mosaics or arrays can be used, such as a Red Green Blue White (RGBW) filter mosaic, a CYGM filter mosaic (in this case "C" stands for "clear", i.e. no filtering), a CYMM filter mosaic, a RGBE filter mosaic and the like. As will be appreciated, the signal provided by the sensor 101b, i.e. the raw signal/image, is generally linearly proportional to the electric current generated in response to the incoming light. Typically, a high bit-depth can be used for one color channel per sample. As already described above, the ISP 105 of the image processing apparatus 100 is configured to restore the color information in the missing locations (so-called de-mosaicing), perform de-noising, white balance, gamma correction, bit-depth reduction, color correction and/or other operations. As will be appreciated, at least some of these operations performed by the ISP 105 are not lossless. Thus, one of the key aspects of the disclosure is to improve the visual quality of the original CFM (e.g. Bayer) image 002 using the neural network 103 prior to the lossy image transformations performed by the ISP 105.

Moreover, the image processing apparatus 100 can comprise further components for post-processing of the final RGB image 004, namely an encoder 107 for encoding the final RGB image 004 into a bitstream 005 and a transmitter 109 for transmitting the encoded bitstream 005 as a network signal, e.g. a radio signal 006, to other devices, such as a server connected with a communication network.

Figure 2:
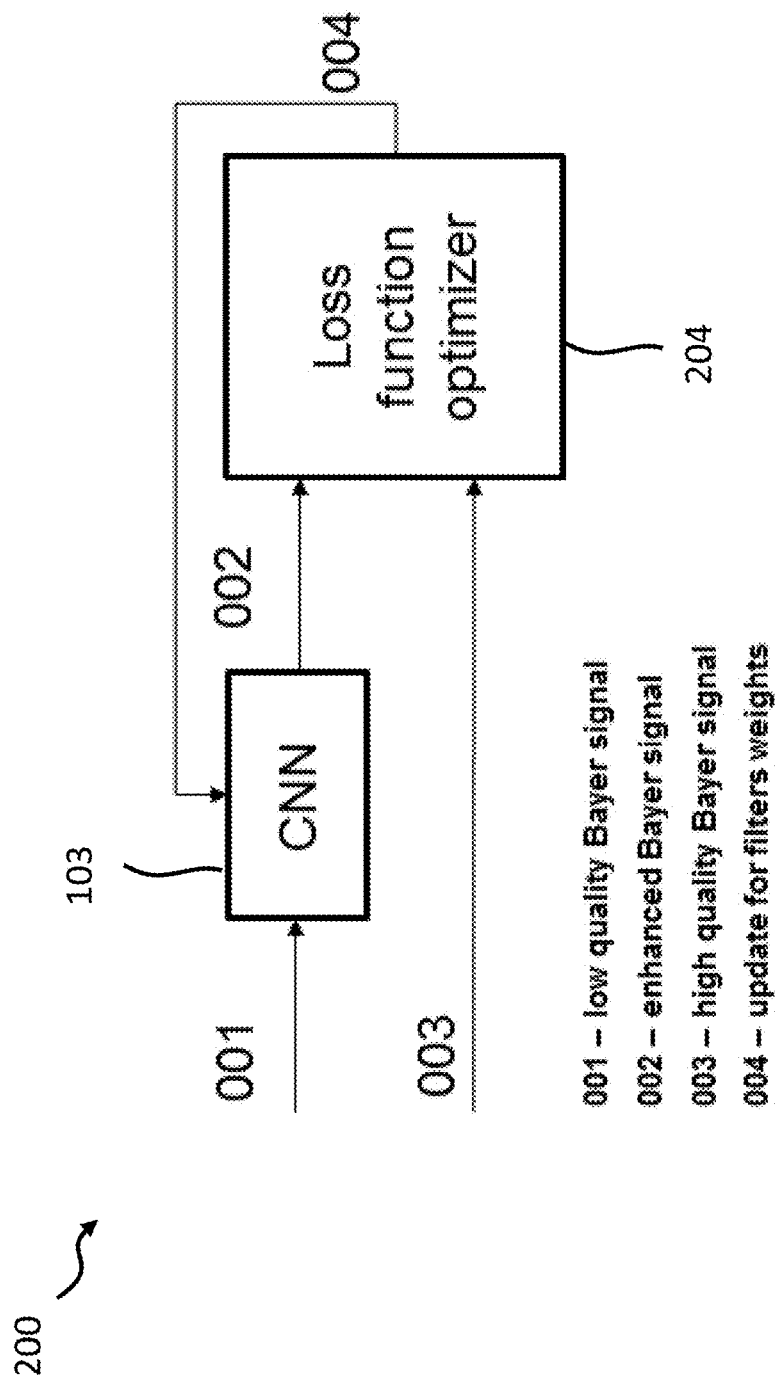
FIG. 2 is a schematic diagram showing an example of a neural network training apparatus according to an embodiment of the disclosure.

FIG. 2 illustrates a neural network training apparatus 200 for training the neural network 103 according to an embodiment. As will be described in more detail below, the neural network training apparatus 200 is configured to train, in a training phase, the CNN 103 using a plurality of pairs of training images, wherein each pair of training images comprises a first training image and a second training image, wherein the first training image and the second training image are a first and a second CFM image of a training scene, respectively. The second raw image should have a better image quality that the first raw image.

According to an embodiment, the neural network training apparatus 200 could be implemented as a component of or on the same electronic device as the image processing apparatus 100 of FIG. 1. Alternatively, the neural network training apparatus 200 can be implemented as a stand-alone device, which is configured to provide a plurality neural network weights to the image processing apparatus 100.

In an embodiment, the CNN 103 is configured to be trained by the neural network training apparatus 200 using a plurality of pairs of Bayer training images, wherein each pair of Bayer training images comprises a low quality original Bayer image of the training scene as a first training image and an enhanced high quality Bayer image of the training scene as a second training image.

According to an embodiment, the neural network training apparatus 200 may be configured to receive the plurality of pairs of Bayer training images from a remote device, such as a server. Alternatively or additionally, the neural network training apparatus 200 may be configured to generate the plurality of pairs of Bayer training images itself, as will be described in more detail in the following.

According to an embodiment, the original Bayer image captured by an image capturing device, such as the image capturing device 101 of the image processing apparatus 100 or an image capturing device of the neural network training apparatus 200 depends on an exposure parameter defining an exposure, wherein the image capturing device is configured to provide the first training image of a respective pair of training images by capturing a first low quality original Bayer image of a respective training scene using a first exposure and to provide the second training image of the respective pair of training images by capturing a second high quality Bayer image of the respective training scene using a second exposure parameter, wherein the exposure defined by the first exposure parameter is shorter than the exposure defined by the second exposure parameter.

According to a further embodiment, the image capturing device, e.g. the image capturing device 101 comprises a first optical element, such as a first lens 101a and a second optical element, such as a second lens, wherein the image capturing device, e.g. the image capturing device 101 is configured to generate the original Bayer image using either the first optical element 101a or the second optical element. In this embodiment, the image capturing device, e.g. the image capturing device 101 is configured to provide the first training image of a respective pair of training images by capturing a first low quality original Bayer image of a respective training scene using the first optical element 101a but not the second optical element and to provide the second training image of the respective pair of training images by capturing a second high quality Bayer image of the respective training scene using the second optical element but not the first optical element, such that the second high quality Bayer image of the respective scene has a higher quality than the first low quality original Bayer image.

According to a further embodiment, the neural network training apparatus 200 may be configured to degrade the visual quality of the captured original Bayer image using at least one image distortion algorithm for obtaining a distorted original Bayer image. In this embodiment, the neural network training apparatus 200 may be configured to provide the first training image of a respective pair of training images by degrading the visual quality of the original Bayer image captured by the image capturing device, e.g. the image capturing device 101 and to provide the original Bayer image captured by the image capturing device, e.g. the image capturing device 101 as the second training image of the respective pair of training images. In an embodiment, the neural network training apparatus 200 is configured to perform the image degradation operation by: distorting the captured original Bayer image; adding noise, in particular Gaussian additive noise to the captured original Bayer image; lowering the brightness of the captured original Bayer image; and/or lowering the contrast of the captured original Bayer image.

According to a further embodiment, the plurality of training images can be provided by capturing the high quality enhanced Bayer image as the second training image in a controlled environment using normal illumination, while capturing the low quality original Bayer image as the first training image using low illumination, i.e. where the illumination provided by an illumination source, such as a lamp is reduced or turned off.

As illustrated in FIG. 2, the CNN 103 can be defined by, i.e. comprise a plurality of filter weights, wherein, in the training phase, the neural network training apparatus 200 is configured to iteratively adjust the plurality of filter weights on the basis of the plurality of pairs of training images by using a back propagation algorithm and minimizing a loss function using, for instance, the loss function optimizer 204 illustrated in FIG. 2. According to an embodiment, the filter weights of the CNN 103 can be initialized by random values in the range [0; 1].

For each pair of training images the loss function depends on the respective visually enhanced Bayer image 002 provided by the CNN 103 on the basis of the first training image 001 and the respective second training image 003. As illustrated in FIG. 2, the loss function optimizer 204 is configured to provide an update 004 for the filter weights to the CNN 103. According to embodiments of the disclosure a plurality of different loss functions can be implemented in the loss function optimizer 204 for training the CNN 103, such as a L1 loss function, a L2 loss function, a SSIM loss function, a MS-SSIM loss function or a combination thereof. For more details concerning possible loss functions reference is made to Hang Zhao et al., "Loss Functions for Image Restoration with Neural Networks". IEEE Transactions on Computational Imaging (Volume: 3, Issue: 1, March 2017), which is fully incorporated by reference herein.

Figure 3:
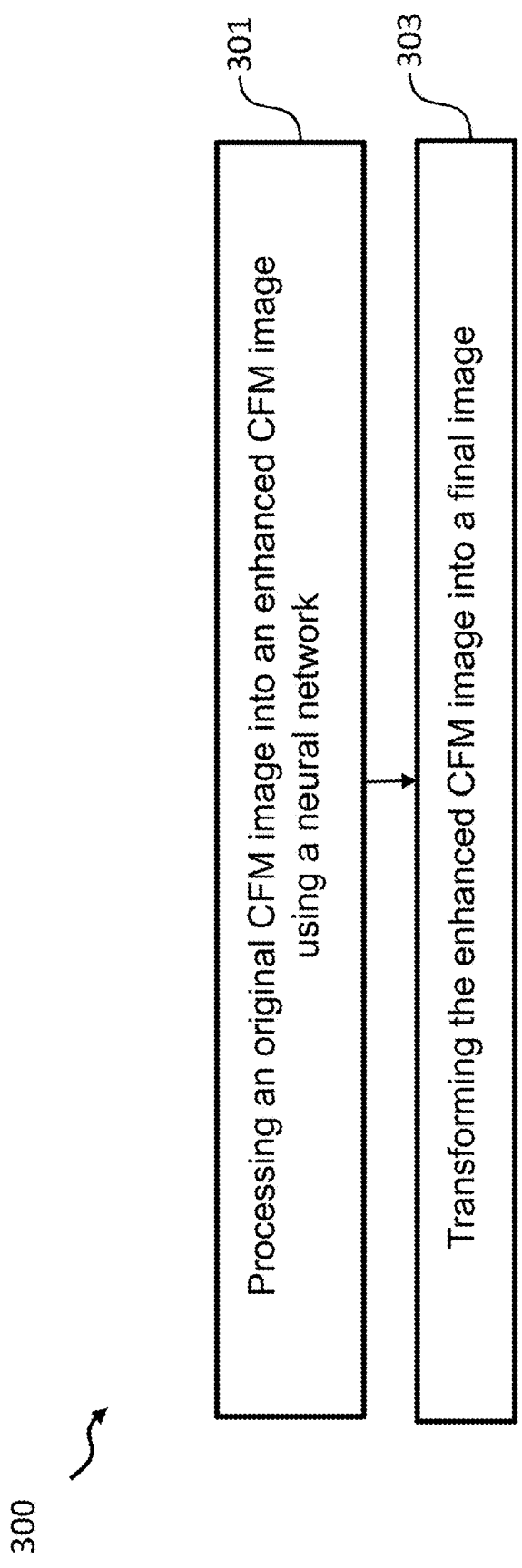
FIG. 3 is a flow diagram showing an example of an image processing method according to an embodiment of the disclosure.

FIG. 3 is a flow diagram showing an example of an image processing method 300 according to an embodiment of the disclosure. The method 300 comprises the steps of: processing 301 the original CFM (e.g. Bayer) image 002 into the visually enhanced CFM (e.g. Bayer) 003 using the neural network 103, wherein each pixel of the visually enhanced CFM image 003 comprises a single sample value in the same color channel as the respective pixel of the original CFM image 002; and transforming 303 the visually enhanced CFM image 003 into the visually enhanced final image 004.

FIG. 4 is a flow diagram showing an example of neural network training method 400 according to an embodiment of the disclosure. The method 400 comprises the step of: training 401 in a training phase the neural network 103 using a plurality of pairs of training images, wherein each pair of training images comprises a first training image and a second training image, wherein the first training image and the second training image are a first and a second CFM image of a training scene, respectively.

The performance of embodiments of the disclosure has been tested using the following set-up. The CNN and the loss function were implemented as disclosed in Ronneberger et al, "U-Net: Convolutional Networks for Biomedical Image Segmentation", arXiv: 1505.04597, wherein the shape of the CNN output layer was changed from (2*W, 2*H, 3) to (W, H, 4) where W denotes the width and H denotes the height of the original Bayer image. A dataset of pairs of Bayer training images were used from Ronneberger et al, "U-Net: Convolutional Networks for Biomedical Image Segmentation", arXiv: 1505.04597 as well, where the high quality Bayer images were captured in a low light environment with auto-exposure setting and the low quality Bayer images were captured using an auto-exposure value decreased a few times. The output of the CNN 103 was processed using a conventional ISP pipeline, as disclosed in Rob Sumner, "Processing RAW Images in MATLAB", link to web page: rcsumner.net/raw_guide/RAWguide.pdf.

Figure 5:
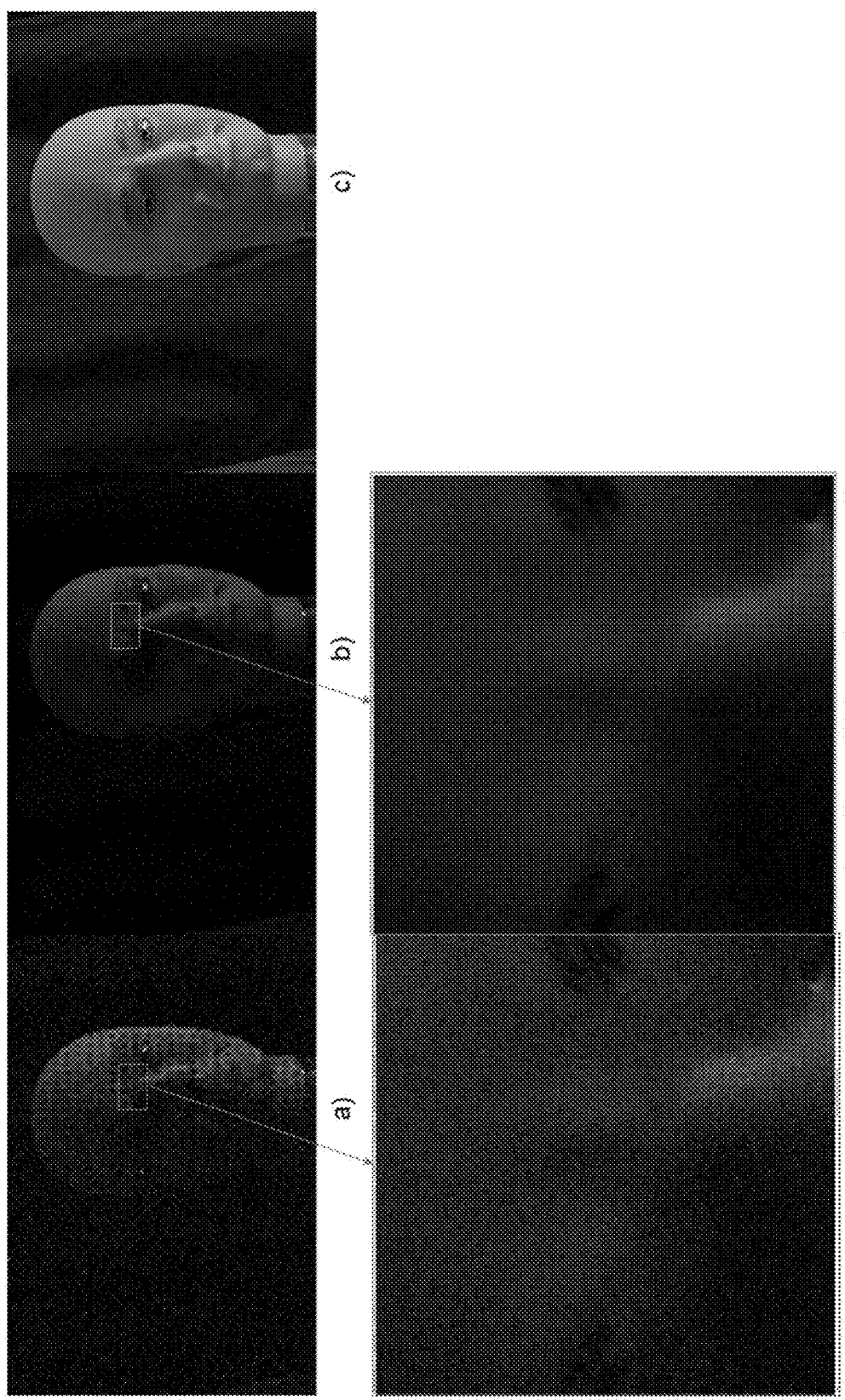
FIG. 5 illustrates an original CFM image based on a Bayer filter mosaic, an enhanced CFM image and a final RGB image as processed and generated by an image processing apparatus according to an embodiment.

FIG. 5 illustrates (a) an example of an original Bayer image and (b) the visually enhanced Bayer image and (c) the visually enhanced final RGB image provided by the image processing apparatus 100 and the image processing method

300 on the basis thereof. For illustration purposes the visually enhanced final RGB image is displayed as a grayscale image. As will be appreciated, the result of the CNN processing is less noisy compared to the input original Bayer image. Also, the result of the CNN 103 is still a Bayer image which looks remarkably different from the RGB image that was obtained using the selected ISP pipeline, which for this example included the following ISP steps: denoising, white balance, de-mosaicing, contrast enhancement and sharpening.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

What is claimed is:

1. An image processing apparatus for processing an original color filter mosaic (CFM) image of a scene into a final image of the scene, the image processing apparatus comprising processing circuitry configured to:
    implement a neural network and process the original CFM image into an enhanced CFM image using the neural network, the original CFM image and the enhanced CFM image corresponding to a same CFM, wherein the neural network is implemented as a pre-processing stage prior to and independent of an image signal processing (ISP) pipeline, so that no retraining of the neural network is required in case of modifications of the ISP pipeline, and
    transform, by applying the ISP pipeline, the enhanced CFM image into the final image.

2. The image processing apparatus of claim 1, wherein the CFM is one of the following: a Bayer filter mosaic, a red green blue emerald (RGBE) filter mosaic, a cyan yellow yellow magenta (CYYM) filter mosaic, a cyan yellow green magenta (CYGM) filter mosaic, or an X-Trans filter mosaic.

3. The image processing apparatus of claim 2, wherein the transforming, by applying the ISP pipeline, the enhanced CFM image into the final image comprises de-mosaicing.

4. The image processing apparatus of claim 1, wherein each or both of the processing the original CFM image into the enhanced CFM image and the transforming, by applying the ISP pipeline, the enhanced CFM image into the final image comprises one or more of the following: denoising, white-balancing, tone mapping, contrast enhancement, or sharpening.

5. The image processing apparatus of claim 1, wherein the image processing apparatus further comprises an image capturing device configured to generate the original CFM image of the scene.

6. The image processing apparatus of claim 1, wherein each of the original CFM image and the enhanced CFM image comprises a plurality of samples correspond to a plurality of color channels, and wherein the pattern of the plurality of samples and the number of the plurality of color channels associated with the original CFM image are the same as those of the enhanced CFM image.

7. The image processing apparatus of claim 1, wherein the neural network remains the same in response to a modification to the ISP pipeline.

8. An image processing method for processing an original color filter mosaic (CFM) image of a scene into a final image of the scene, the method comprising:
    processing the original CFM image into an enhanced CFM image using a neural network, wherein the neural network is implemented as a pre-processing stage prior to and independent of an image signal processing (ISP) pipeline, so that no retraining of the neural network is required in case of modifications of the ISP pipeline; and
    transforming, by applying the ISP pipeline, the enhanced CFM image into the final image.

9. A non-transitory computer-readable storage medium carrying program code which causes a computer or a processor to perform the method of claim 8 when the program code is executed by the computer or the processor.

10. The method of claim 8, wherein each of the original CFM image and the enhanced CFM image comprises a plurality of samples correspond to a plurality of color channels, and wherein the pattern of the plurality of samples and the number of the plurality of color channels associated with the original CFM image are the same as those of the enhanced CFM image.

11. The method of claim 8, wherein the neural network remains the same in response to a modification to the ISP pipeline.

* * * * *